(12) United States Patent
Kress

(10) Patent No.: US 8,555,757 B2
(45) Date of Patent: Oct. 15, 2013

(54) TOOL FOR MACHINING WORKPIECE SURFACES

(75) Inventor: Dieter Kress, Aalen (DE)

(73) Assignee: Mapal Fabrik fur Prazisionswerkzeuge Dr. Kress KG, Aalen (DE)

( * ) Notice: Subject to any disclaimer, the term of this patent is extended or adjusted under 35 U.S.C. 154(b) by 470 days.

(21) Appl. No.: 11/990,971

(22) PCT Filed: Aug. 25, 2006

(86) PCT No.: PCT/EP2006/008347
§ 371 (c)(1),
(2), (4) Date: Feb. 25, 2008

(87) PCT Pub. No.: WO2007/025678
PCT Pub. Date: Mar. 8, 2007

(65) Prior Publication Data
US 2009/0193932 A1    Aug. 6, 2009

(30) Foreign Application Priority Data
Sep. 2, 2005    (DE) .......................... 10 2005 042 718

(51) Int. Cl.
*B23B 3/26*    (2006.01)

(52) U.S. Cl.
USPC ................................. 82/131; 82/1.2; 408/152

(58) Field of Classification Search
USPC .............. 82/113, 1.2, 1.4, 123, 131; 408/147, 408/150–152
See application file for complete search history.

(56) References Cited

U.S. PATENT DOCUMENTS

| | | | | |
|---|---|---|---|---|
| 2,820,376 A * | 1/1958 | Jannenga et al. | ................ | 82/1.2 |
| 2,842,238 A * | 7/1958 | Shaw et al. | ................... | 409/179 |
| 2,960,013 A * | 11/1960 | Novkov | ........................ | 409/200 |
| 3,599,517 A * | 8/1971 | Muller | ............................ | 82/131 |
| 3,710,659 A | 1/1973 | Pagella et al. | | |
| 3,884,590 A * | 5/1975 | Skrentner et al. | ................. | 408/8 |
| 4,154,555 A * | 5/1979 | Skrentner | ....................... | 408/25 |

(Continued)

FOREIGN PATENT DOCUMENTS

DE    20 14 690 A1    11/1971
DE    34 03 804         8/1984

(Continued)

OTHER PUBLICATIONS

Japanese Office Action for parallel procedure JP2008-528390, mailed Jan. 17, 2012.

(Continued)

*Primary Examiner* — Andrea Wellington
*Assistant Examiner* — Sara Addisu
(74) *Attorney, Agent, or Firm* — Harness, Dickey & Pierce, P.L.C.

(57) ABSTRACT

A tool for the machining of workpiece surfaces includes at least one adjustable, geometrically defined cutting edge. The tool additionally includes an adjusting device for the adjusting of the distance of the cutting edge to the central axis of tool. The adjusting device has a drive shaft that acts on an adjusting slide via a gearbox, which determines the distance of cutting edge from the central axis of tool. The adjusting slide may be a round slide arranged eccentrically to the central axis of tool. The gearbox may have a high reduction and may directly act on the adjusting slide.

23 Claims, 3 Drawing Sheets

(56) References Cited

U.S. PATENT DOCUMENTS

| | | | | |
|---|---|---|---|---|
| 4,411,178 A | * | 10/1983 | Wachs et al. | 82/113 |
| 4,494,617 A | * | 1/1985 | Snyder | 175/86 |
| 4,569,115 A | * | 2/1986 | Unno et al. | 29/558 |
| 4,602,539 A | * | 7/1986 | Tsukiji | 82/1.2 |
| 4,742,738 A | * | 5/1988 | Strand | 82/1.11 |
| 4,773,799 A | * | 9/1988 | Guironnet | 408/150 |
| 4,852,438 A | | 8/1989 | Reiterman | |
| 4,930,585 A | * | 6/1990 | Noser et al. | 175/220 |
| 5,020,613 A | * | 6/1991 | Bergner | 175/273 |
| 5,036,928 A | * | 8/1991 | Mark | 175/263 |
| 5,076,743 A | * | 12/1991 | Mark | 408/151 |
| 5,954,462 A | * | 9/1999 | Way et al. | 408/153 |
| 5,957,632 A | * | 9/1999 | Oketani et al. | 408/150 |
| 6,014,907 A | * | 1/2000 | Rilbe | 74/395 |
| 6,134,996 A | | 10/2000 | Scheer et al. | |
| 6,579,046 B2 | * | 6/2003 | Eysel et al. | 408/150 |
| 7,048,482 B2 | * | 5/2006 | Gruber et al. | 409/143 |
| 2002/0001512 A1 | * | 1/2002 | Eysel et al. | 408/150 |

FOREIGN PATENT DOCUMENTS

| | | |
|---|---|---|
| DE | 197 17 172 | 11/1997 |
| DE | 103 06 845 A1 | 9/2004 |
| EP | 0 966 335 | 12/1999 |
| EP | 1 221 350 A2 | 7/2002 |
| GB | 2130937 A | 6/1984 |
| JP | 57-108804 U | 7/1982 |
| JP | 5947108 | 3/1984 |
| JP | 03019706 A * | 1/1991 |
| JP | 03086405 A * | 4/1991 |
| JP | 04 365503 A | 12/1992 |
| JP | 08 001413 A | 1/1996 |

OTHER PUBLICATIONS

Office Action regarding Japan Application No. 2008-528390 mailed Sep. 4, 2012.

* cited by examiner

TOOL FOR MACHINING WORKPIECE SURFACES

FIELD

The present teachings generally relate to a tool for machining workpiece surfaces.

BACKGROUND

Tools of the type mentioned here are known. They have at least one adjustable, geometrically defined cutting edge, in addition to an adjusting device, with which the distance of the cutting edge from the central axis of the workpiece can be adjusted. The adjusting device comprises a drive that acts on the adjusting slide via a gearbox, which determines the distance of the cutting edge from the central axis of the workpiece. The adjusting slide is arranged eccentrically to the central axis of the workpiece and designed as a round slide, i.e., the adjusting slide is rotated for the adjustment of the distance of the cutting edge to the central axis of the workpiece, so that a cutting edge that is attached to an adjusting slide is displaced in such a way that the distance to the central axis of the workpiece is changed.

The disadvantage of this tool is that the adjustment of the cutting edge cannot take place with specifically high precision, because the adjusting slide is changed by means of a spur gear in its position. Defects in the gear teeth, such as the spacing between the gear teeth or play between the interactive spur gears directly interfere with the positioning of the cutting edge. The latter may also not be precisely adjusted due to the defect.

The task of the invention is thus to develop a tool for machining workpiece surfaces of the type mentioned here, in which this disadvantage does not exist in this fashion.

SUMMARY

In order to solve this task, a tool is proposed that has an adjustable, geometrically defined cutting edge, which is adjustable by means of an adjusting device. In this manner, the distance of the cutting edge to the central axis of the tool may be predetermined. The adjusting device has a drive, which acts on a gearbox via at least one spur gear. This directly affects the position of the adjusting slide, thus the distance of the geometrically defined cutting edge to the central axis of the workpiece. Thus, a spur gear is no longer envisioned between the gearbox and the adjusting slide, contrary to the known solution, so that here also, no spacing and/or play defect can occur. Due to the fact that the gearbox has a high gear reduction, defects during the transfer of a torque from the drive via spur gears to the gearbox corresponding to the gear reduction of the gearbox are reduced. In this manner, it is possible, despite gear tooth defects that can never be completely avoided, to guarantee a very precise positioning of the cutting edge.

BRIEF DESCRIPTION OF THE DRAWINGS

The invention is further explained below by means of the drawing. Shown are.

DETAILED DESCRIPTION

Figure 1:
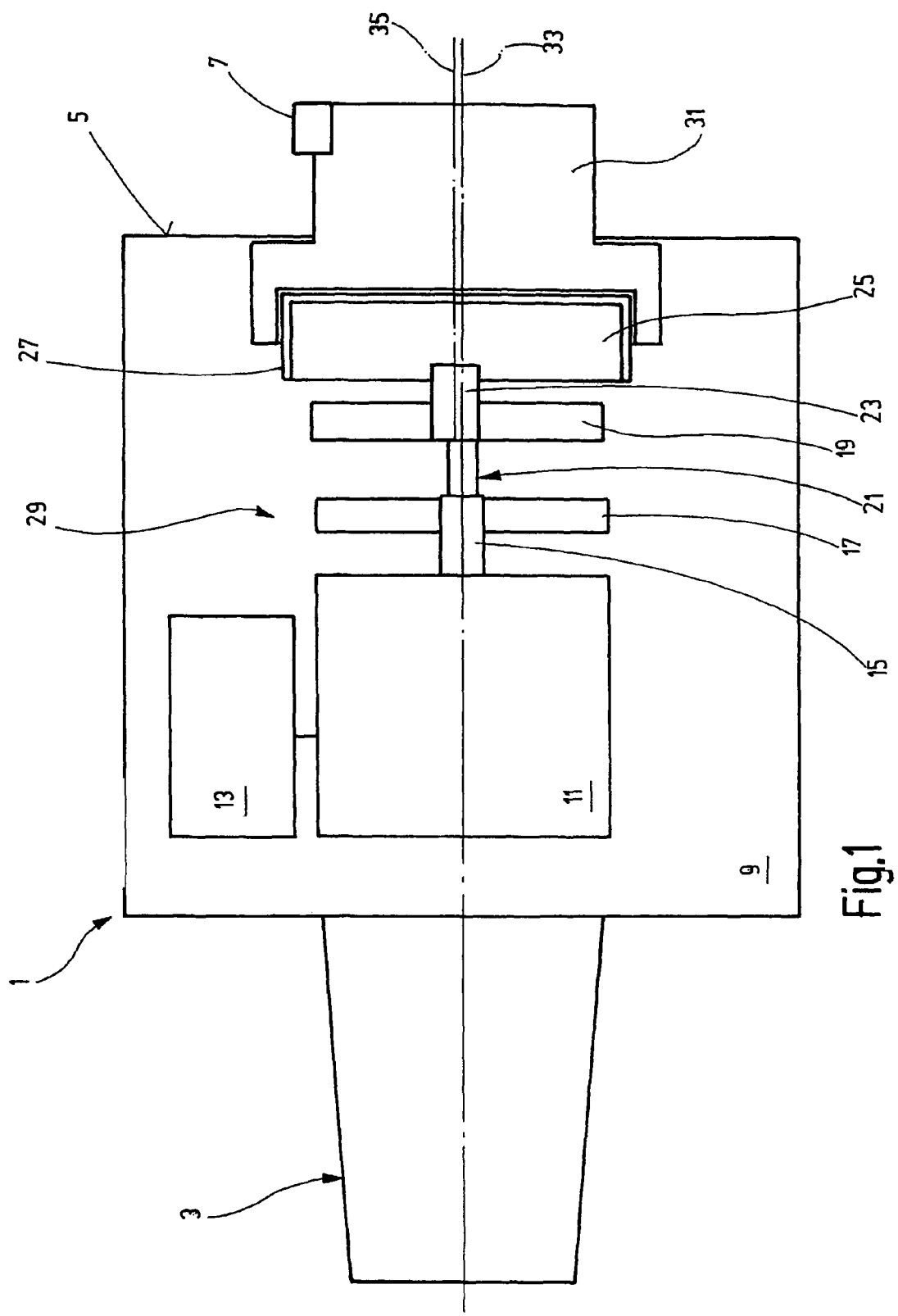
FIG. 1 A schematic diagram of a lateral view of the tool

The schematic diagram according to FIG. 1 shows a tool 1 that may be connected via a shaft 3, which is only indicated here, to a spindle of a tool machine or with interfaces, adapters or the like. On the side 5 opposite the shaft 3, a geometrically defined cutting edge 7 is indicated. This may be part of the tool or a cutting tip plate that is fastened to tool 1 in a suitable manner. It is possible to also envision a suitable tool holder, such as a magazine or the like.

The main body 9 of tool 1 comprises, for example, a drive 11 designed as an electric motor, which can be controlled via a suitable control system 13, whereby drive 11 can be switched on and off as and the speed and the rotating direction of the driven shaft 15 of drive 11 can be predetermined. An initial spur gear 17 is attached torque proof to the free end of the driven shaft 15. The rotation of the initial spur gear 17 is transmitted in a suitable manner to a second spur gear 19. A transmitting device 21 lies outside the image plane according to FIG. 1, which will be explained in greater detail below.

The second spur gear is attached torque proof to the end of a drive shaft 23, which transmits a rotation and a torque of the second spur gear 19 to a gearbox 25. This is characterized preferably by a high speed reduction.

Here planetary gears or, in particular, also a harmonic drive gearbox can be used. With gearbox 25 illustrated here, it is envisioned that a rotary motion introduced via the drive shaft 23 in gearbox 25 is transmitted to housing cap 27 of gearbox 25. It appears in the process that this rotates with a much smaller rotational speed than drive shaft 23. If the second spur gear 19 of drive 11 rotates at a given rotating angle, housing cap 27 rotates only at a very much smaller rotating angle corresponding to the gear reduction of gearbox 25.

Drive 11 and gearbox 25 are components of an adjusting device 29, which furthermore still comprises an adjusting slide 31. It can be seen from the schematic diagram that gearbox 25 acts directly on the adjusting slide 31. Here it is envisioned that the adjusting slide is directly connected to the drive, which is designated here as housing cap 27. A rotation of housing cap 27 thus directly produces a rotation of the adjusting slide 31 designed as a rotating round slide, whereby a rotation of housing cap 27 1:1 is transmitted to adjusting slide 31.

It is clear that a rotation produced by drive 11 is transmitted to gearbox 25 of spur gear 17 via transmitting device 21 and via the second spur gear 19. The latter is connected torque proof to drive shaft 23, which introduces a rotary motion of the second spur gear 19 in gearbox 25. Tolerances have an effect on the path between drive 11 and drive shaft 23 during the manufacturing on both the drive itself and spur gears 17 and 19 as well as transmitting device 21. These defects are strongly reduced by gearbox 25. A given rotating angle at the entry of gearbox 25, thus on drive shaft 23, produces a much smaller rotating angle corresponding to the gear reduction of the gearbox at its exit, i.e., housing cap 27. Rotating angle defects that occurred in the area between drive 11 and drive shaft 23 are likewise reduced corresponding to the gear reduction of gearbox 25 and thus produce a very much smaller rotating angle defect at the exit side of the gearbox, i.e., housing cap 27.

It is critical that that no more spur gears be interconnected between housing cap 27 and adjusting slide 31, whose manufacturing tolerances could distort the rotating angle of housing cap 27. In fact, a given rotating angle of housing cap 27 leads directly to a rotation of the adjusting slide 31 designed as a round slide. The resulting gear reduction in gearbox 25 of a rotating angle defect in the area of the drive shaft 23 is thus maintained unaltered during the rotating displacement of adjusting slide 31.

The distance of cutting edge 7 to central axis 33 of tool 1 is adjusted by means of the adjusting device 29. In order to produce a change of this distance by a rotation of adjusting slide 31, its rotating axis 35 is shifted parallel to central axis 33; adjusting slide 31 is thus arranged eccentrically in the main body 9 of tool 1. At the same time, the second spur gear 19 is also arranged coaxially to rotating axis 35 and thus eccentrically to the central axis of tool 1. With the embodiment selected here, gearbox 25 thus also lies eccentrically to central axis 33 and coaxially to rotating axis 35.

Figure 2:
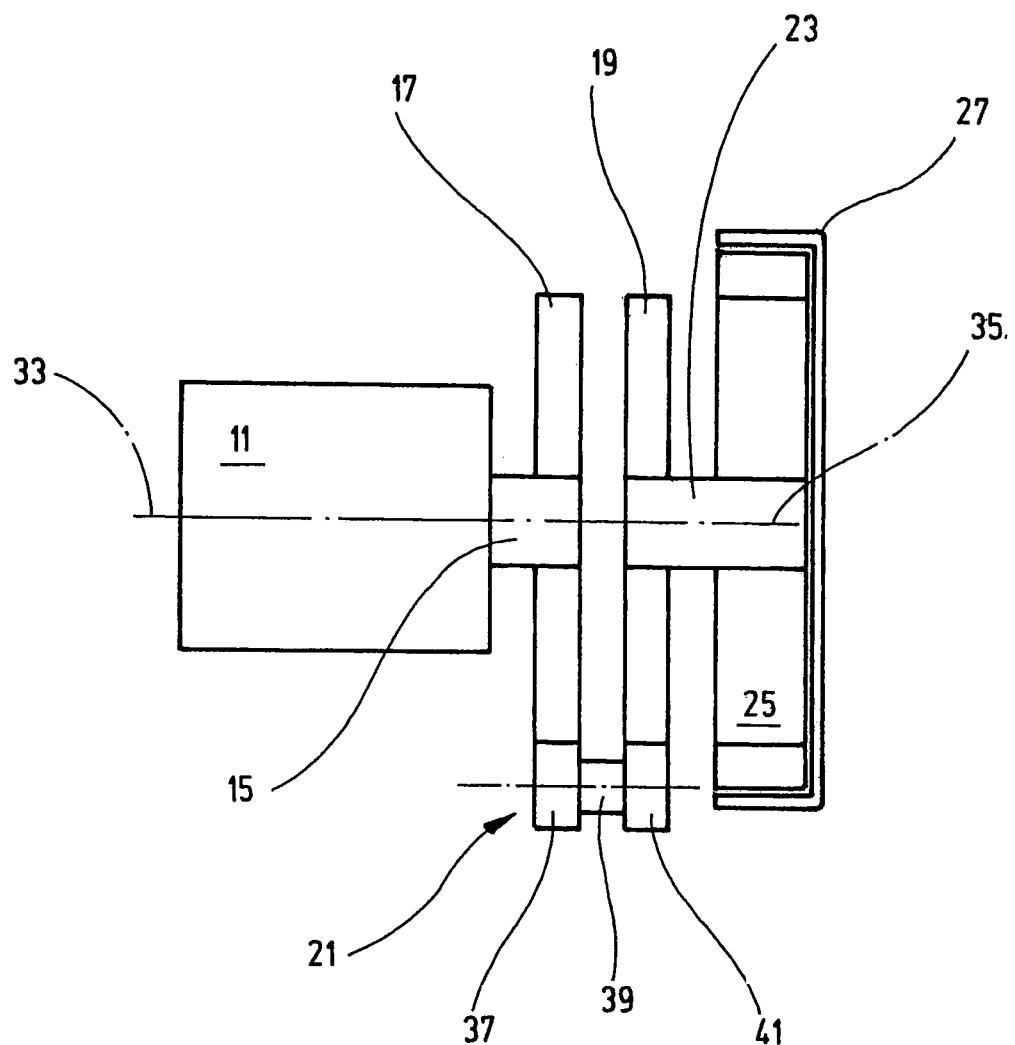
FIG. 2 Another simplified schematic diagram of a lateral view of a tool, whereby the tool is rotated 90° with respect to FIG. 1, and FIG. 3 A schematic diagram of a front view of a tool with various positions of a cutting edge.

FIG. 2 shows a schematic diagram of the components of the tool 1 illustrated in FIG. 1, i.e., drive 11, its driven shaft 15 as well as the first spur gear 17. Transmitting device 21 is clearly visible here, because the components of tool 1 are clearly rotated 90° with respect to the illustration in FIG. 1. Transmitting device 21 has an initial first pinion gear 37 that meshes with the first spur gear 17, which acts on a second pinion gear 41 via a transfer shaft 39. This meshes with the second spur gear 19.

Depending upon the arrangement of transmitting device 21, thus after the selection of the diameter of the first spur gear 17, of the first pinion gear 37, of the second pinion gear 41 and of the second spur gear 19, a desired gearbox ratio may be predetermined.

It is clear here that a rotation of driven shaft 15 of drive 11 by means of the transmitting device 21 leads to a rotation of drive shaft 23, which is introduced in gearbox 25. Here, this is also configured as high-reduction gearing. A rotation of the drive shaft 23 also leads to a rotation of the housing cap 27, whereby the rotating direction of housing cap 27 is opposite to that of drive shaft 23, if the gearbox 25 is configured as a harmonic drive gearbox or planetary gears.

After reading the explanations, it is evident that a rotation of driven shaft 15 leads to a rotation of housing cap 27. At the same time, a rotation of the first spur gear 17 by means of the transmitting device 21 is transmitted to the second spur gear 19. The rotating angle of the first spur gear 17 is very greatly reduced by gearbox 25, so that a very much smaller rotating angle is produced for housing cap 27. The speed reduction of the gearbox also leads to the defect in the gear tooth system between the first spur gear 17 and the second pinion gear 37 as well as between the second pinion gear 41 and the second spur gear 19 are correspondingly "reduced", or diminished. In other words: Defects in the gear teeth between spur gear 17 and 19 and in transmitting device 21 are substantially reduced by gearbox 25 and, for all intents and purposes, no longer affect the adjustment of cutting tip plate 7 connected via an adjusting slide 31 to housing cap 27.

Transmitting device 21 illustrated in FIG. 2 may also be modified: FIG. 2 illustrates that the first and second spur gears 17 and 19 mesh with the first and second pinion gears 37 and 41. It is also conceivable that, instead of the spur gears and pinion gears, pulleys are used and a rotation of the first spur gear 17 is transmitted to the first pinion gear 37 by means of a belt. At the same time, for the second spur gear 19 on the other hand, a spur gear may again be used or, likewise, a belt pulley. This also applies to the second pinion gear 41.

Also, it must still be indicated, that spur gears 17 and 19 are here only approximately commensurately designed as an example. Spur gears with different diameters may also be used here.

In addition, it is possible to design the first and/or second spur gear 17, 19 as a hollow gear with internal teeth and correspondingly, the first and/or second pinion gear, 37, 41 can be meshed within this hollow gear.

Another modification of the transmitting device 21 may designed, in which the first spur gear 17 is designed substantially smaller and meshes with a second spur gear 19 designed as an hollow gear whose diameter is greater than that of the first spur gear 17. The eccentric misalignment may thus also be realized by means of a single-stage gearbox with internal teeth.

Finally, it should still be indicated that transmitting device 21 may also be realized by a multi-stage gearbox.

Figure 3:
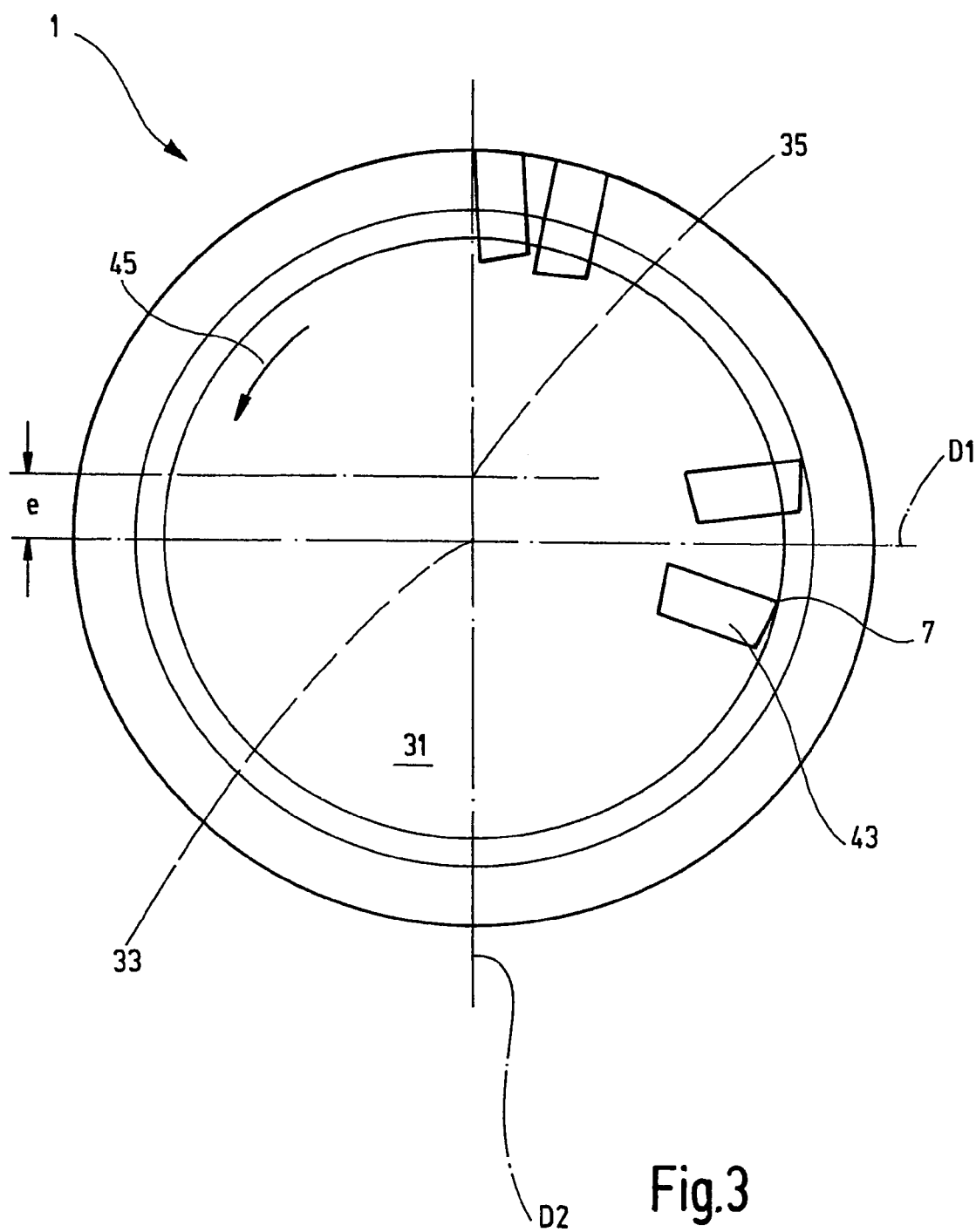

FIG. 3 shows a schematic diagram of tool 1 from the front, thus on side 5, lying opposite the shaft 3. The illustration shows a cutting edge 7, which is a component of a cutting tip plate 43, in various positions. According to the rotating position of the adjusting slide 31, cutting edge 7 is arranged at a more or less great distance to the central axis 33 of tool 1.

Below to the right, beneath a horizontal diameter line D1, cutting edge 7 is arranged here at a distance to rotating axis 33. With a corresponding layout of tool 1, this may, for example, be selected in such a way that a borehole machined with a cutting edge 7 has a diameter of approx. 38.0.

If adjusting slide 31 is designed as a rotating slide valve rotates in the direction of arrow 45, thus counterclockwise, so that, with a corresponding layout of working spindle 1, cutting edge 7 is at a distance from central axis of tool 1, with the machining of a borehole by means of tool 1, a diameter of approx. 41.5 mm is produced. If adjusting slide 31 further rotates counterclockwise in the direction of arrow 45, so that it lies just in front of the perpendicular diameter line D2, a diameter of approx. 48.0 mm is produced when the borehole is machined by means of tool 1.

If, finally, adjusting slide 31 is rotated in such a way that cutting edge 7 is lined up with the graduation of D2, then a diameter of 48.23 mm is produced when the borehole is machined by means of tool 1.

It is clear here, that the adjustment of the diameter of tool 1 depends upon a rotation of adjusting slide 31. Rotating angle defects thus lead to a deviation of the set diameter of tool 1 from the target diameter. As explained above, rotating angle defects between drive 11 and the entrance of gearbox 25, thus at its drive shaft 23, are strongly reduced by gearbox 25. In other words, the reduction of gearbox 25 reduces an existing rotating angle defect at the entrance of the gearbox in such a way that it practically no longer has any effect at the exit of the gearbox and thus on housing cap 27. Thus, the rotating angle appears to correspond exactly to the rotating angle of rotating slide valve 31 of housing cap 27. As a result, the advantage of using this tool 1 described herein is obtainable, because gearbox 25 has a high reduction and directly acts on adjusting slide 31, thus without any interconnections of further spur gears or the like.

The difference between the smallest and the largest indicated borehole diameter depends upon how great the distance between central axis 33 of tool 1 and rotating angle 35 of adjusting slide 31 is. The greater the distance "e" is, so much greater the difference of both indicated diameters is.

The change of the diameter of a borehole by means of tool 1 is exclusively produced by a rotary motion of the adjusting slide 31. The result is that a sealing of the tool in an easy manner is possible. It requires only the use of rotating seals. Losses can be reduced to a minimum by means of antifriction bearings, so that no slide bearings are used.

With the rotation of adjusting slide 31, a once balanced tool 1 remains balanced: With diameter adjustment, no centers of mass/gravity actually move, so very high machining speeds are possible. Moreover, the balancing of the tool is likewise relatively easy.

From the explanations, it appears that all of the backlashes occurring up to gearbox 25 are reduced with the reduction factor of gearbox 25. The disengaging of drive 11, thus the angle adjustment of the first spur gear 17, is increased by the reduction. In addition, it appears that with a higher reduction of gearbox 25, also with small motors, that are used as drive 11, high torque can be produced during the displacement of adjusting slide 31.

To increase the precision of the tool, so-called pre-stressed and thus spur gears free of play can be used.

By means of a suitable control of drive 11 by means of the control system 13, the distance of cutting edge 7 from the central axis 33 of the tool can be changed during the machining of a borehole surface. It is thus possible to produce boreholes with a contour, such as chamfering, annular grooves, undercuts, conical boreholes and the like.

The invention claimed is:

1. A tool for machining of workpiece surfaces comprising:
at least one adjustable, geometrically defined cutting edge; and
an adjusting device for adjusting a distance of the cutting edge relative to a central axis of the tool, the adjusting device having a drive which acts via a gearbox on an adjusting member, which determines the distance of the cutting edge from the central axis of the tool;
the gearbox has a gear reduction and acts directly on the adjusting member;
wherein the adjusting member is a cylindrical element having a central axis arranged eccentrically relative to the central axis of the tool;
wherein the gearbox is concentrically arranged relative to the central axis of the adjusting member; and
wherein the gearbox has a housing cap that acts directly on the adjusting member.

2. The tool according to claim 1, wherein the gearbox is a harmonic-drive gearbox.

3. The tool according to claim 1, wherein the adjusting member is connected to an exit side housing of the gearbox.

4. The tool according to claim 1, wherein at least one spur gear is designed as a pre-stressed spur gear.

5. The tool according to claim 1, further comprising a transmitting device, by rotation of a drive shaft of the drive can be transmitted to gearbox, and which can be realized as a one, two or three-step gearbox.

6. The tool according to claim 1, wherein the adjusting member determines a distance of the cutting edge from the central axis.

7. The tool according to claim 1, wherein the adjusting device adjusts the cutting edge in a radial direction relative to the central axis.

8. The tool of claim 1, wherein the cutting edge is disposed at an outer surface of the cylindrical element.

9. The tool of claim 1, wherein rotation of the cylindrical element results in a radial movement of the cutting edge relative to the central axis of the tool.

10. The tool of claim 1, wherein rotation of the housing cap directly produces a rotation of the adjusting member.

11. The tool of claim 1, wherein rotation of the housing cap is transmitted at a ratio of 1:1 to the adjusting member.

12. The tool of claim 1, wherein the adjusting member circumferentially surrounds a portion of the housing cap.

13. The tool of claim 1, wherein the adjusting member directly carries the cutting edge.

14. A tool for machining a workpiece, the tool comprising:
a drive motor coupled to a driver shaft;
a transmitting device for transmitting torque from the driver shaft to a drive shaft;
a gearbox having a gear reduction, the gearbox coupled to the drive shaft; and
an adjusting member acted directly on by the gearbox, the adjusting member carrying at least one cutting edge, the adjusting member being a cylindrical element having a central axis arranged eccentrically relative to a central axis of the tool;
wherein the at least one cutting edge is radially adjustable relative to the central axis of the tool and wherein the gearbox is concentrically arranged to the central axis of the adjusting member; and
wherein the gearbox includes a housing cap that acts directly on the adjusting member.

15. The tool of claim 14, wherein rotation of the cylindrical element results in a radial movement of the cutting edge relative to the central axis of the tool.

16. The tool of claim 14, wherein the cutting edge is disposed at an outer surface of the cylindrical element.

17. The tool of claim 14, wherein rotation of the drive motor is transmitted to a first gear of the gearbox via the transmitting device and via a second gear, the second gear connected torque proof to the drive shaft which introduces a rotary motion of the second gear in the gearbox, whereby tolerances on a path between the drive motor and the drive shaft are reduced by the gearbox such that a given rotating angle at an entry of the gearbox and thereby on the drive shaft produces a much smaller rotating angle corresponding to gear reduction of the gearbox at an exit defined by the housing cap.

18. The tool of claim 14, wherein rotation of the housing cap directly produces a rotation of the adjusting member.

19. The tool of claim 14, wherein rotation of the housing cap is transmitted at a ratio of 1:1 to the adjusting member.

20. The tool of claim 14, wherein the adjusting member circumferentially surrounds a portion of the housing cap.

21. The tool of claim 14, wherein the adjusting member directly carries the cutting edge.

22. The tool of claim 14, wherein rotation of the drive motor is transmitted to a first gear of the gearbox via the transmitting device and via a second gear, the second gear connected torque proof to the drive shaft which introduces a rotary motion of the second gear in the gearbox, whereby tolerances on a path between the drive motor and the drive shaft are reduced by the gearbox such that a given rotating angle at an entry of the gearbox and thereby on the drive shaft produces a much smaller rotating angle corresponding to gear reduction of the gearbox at an exit defined by the housing cap.

23. A tool for machining a workpiece, the tool comprising:
a drive motor coupled to a driver shaft;
a transmitting device for transmitting torque from the driver shaft to a drive shaft;
a gearbox having a gear reduction, the gearbox coupled to the drive shaft; and
an adjusting member acted directly on by the gearbox, the adjusting member carrying at least one cutting edge, the adjusting member being a cylindrical element having a central axis arranged eccentrically relative to a central axis of the tool;
wherein the at least one cutting edge is radially adjustable relative to the central axis of the tool and wherein the gearbox is concentrically arranged to the central axis of the adjusting member;
wherein the gearbox includes a housing cap that acts directly on the adjusting member; and wherein rotation of the drive motor is transmitted to a first gear of the gearbox via the transmitting device and via a second gear, the second gear connected torque proof to the drive shaft which introduces a rotary motion of the second gear in the gearbox, whereby tolerances on a path between the drive motor and the drive shaft are reduced by the gearbox such that a given rotating angle at an entry of the gearbox and thereby on the drive shaft produces a much smaller rotating angle corresponding to gear reduction of the gearbox at an exit defined by the housing cap.

* * * * *